J. E. ZION.
CALIPERING DEVICE.
APPLICATION FILED APR. 29, 1919.
1,312,606.
Patented Aug. 12, 1919.
2 SHEETS—SHEET 1.
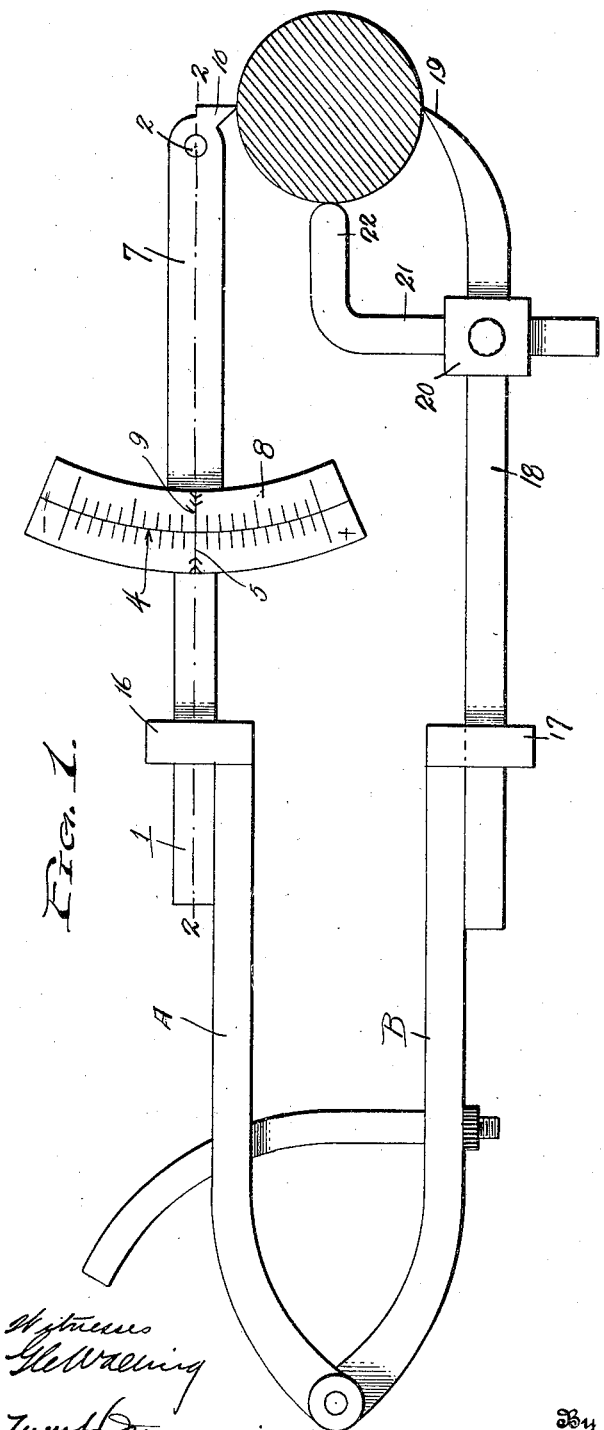
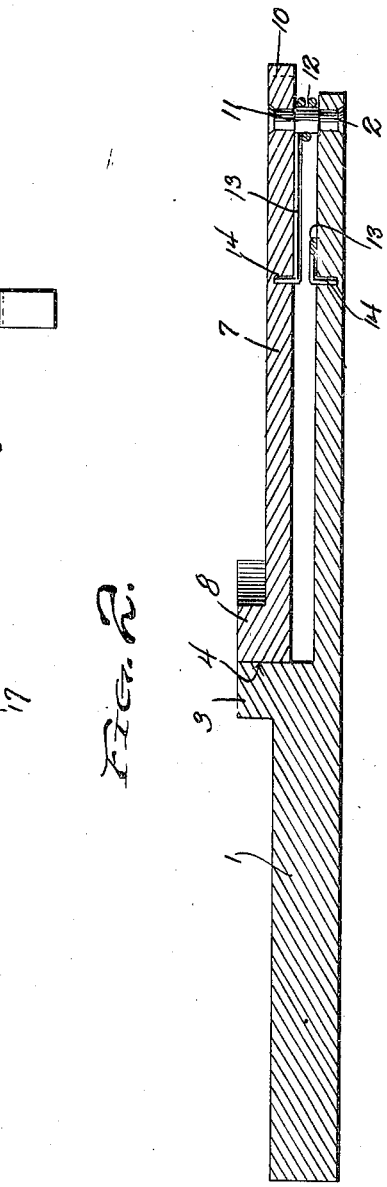
Inventor
John E. Zion

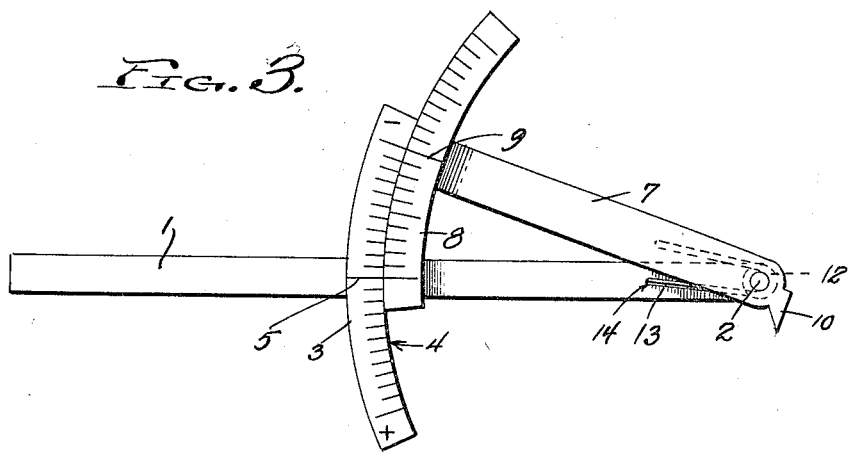
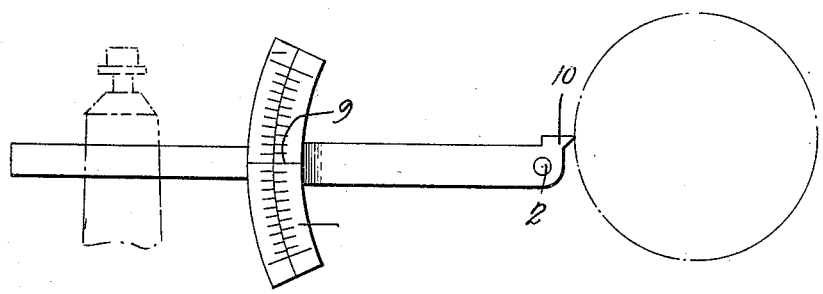
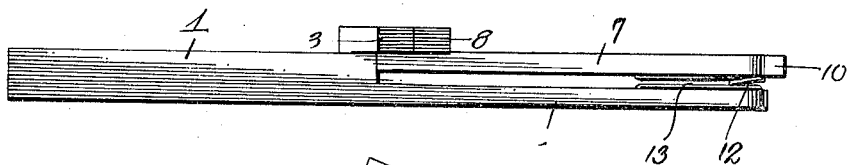
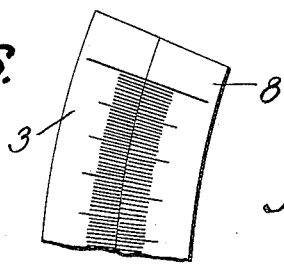

UNITED STATES PATENT OFFICE.

JOHN E. ZION, OF ENID, OKLAHOMA.

CALIPERING DEVICE.

1,312,606.   Specification of Letters Patent.   Patented Aug. 12, 1919.

Application filed April 29, 1919. Serial No. 293,466.

*To all whom it may concern:*

Be it known that I, JOHN E. ZION, a citizen of the United States, residing at Enid, in the county of Garfield and State of Oklahoma, have invented certain new and useful Improvements in Calipering Devices, of which the following is a specification.

This invention relates to calipers and more particularly to an improved measuring device especially adapted for use in determining irregularities or unevenness in a shaft.

With the ordinary plain calipers, it is an easy matter to determine the diameter of a shaft, but when it is desired to determine whether or not the shaft is perfectly round, or has a flat surface, or is irregular in cross section, it is necessary to possess a trained sense of touch while passing the points of the calipers around the shaft, and even then the variations in the shaft cannot be accurately recorded or determined.

It is one of the objects of this invention, therefore, to provide a device which will record the variations as the caliper is passed around the surface of the shaft and the user may accurately determine what parts are widest and also the parts which are flat and irregular.

A further object of the invention is the provision of a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a side elevation showing the application of the invention,

Fig. 2 is a section taken approximately on the line 2—2 of Fig. 1,

Fig. 3 is a side elevation of the attachment in one of the positions it assumes while in use, Fig. 4 is a side elevation illustrating a further use of the device, Fig. 5 is a top edge or plan view, Fig. 6 is a fragmentary elevation of the graduations which may be employed on the scale used in connection with the device.

Referring to the drawings, wherein is illustrated the preferred form of my invention, in which like characters of reference indicate like or corresponding parts throughout the several views, the arm 1 may be of any desired length and has a pivot pin 2 at one end which projects laterally from one side of the arm. An arcuate scale 3 is fastened to or integrally formed with the arm 1 and is of segmental formation and of any desired length, the edge 4 of the scale being curved through an arc struck from the center of the pin 2. The scale is provided with graduations beginning from a central mark 5 and extending in opposite directions toward the ends of the scale. One end of this scale 3 is marked with the minus sign and the opposite end of the scale is marked with the plus sign.

Pivotally mounted upon the pin 2 is a relatively short arm 7 which is normally parallel with the portion of the arm 1 which extends forwardly toward the pivot pin from the scale 3. This arm 7 is adapted to swing on the pivot pin and carries a complementary scale 8, one edge of which contacts with the edge 4 of the scale 3 as shown to advantage in the drawings. This scale is also graduated, the graduations beginning from a central mark 9 and extending in opposite directions toward the ends of the scale. These two complementary scales 3 and 8 may be graduated in any preferred manner and are preferably provided with graduations to form the well known vernier whereby minute readings may be secured. The arm 7 is provided at its pivoted end with an extension finger 10 which is pointed as shown and the distance from the center of the pin 2 to the point of the finger 10 may be any desired length so long as it is known and is in proportion to the length of the arm 7. It has been found preferable to make this finger one tenth of the length of the arm 7 so that the scale will move through a distance ten times as great as the movement of the point of the finger 10 when the arm 7 is swung on the pin 2. It will be noted by referring to Fig. 2, that there is a space intervening between the adjacent faces of the arms 1 and 7, and a collar or shoulder 11 on the pivot pin maintains the arms in the desired spaced relation. Surrounding the portion 11 of the pivot pin is a coil spring 12 which has terminal arms 13 provided with fingers 14 which project into conveniently located recesses in the arm. This spring normally tends to swing the arm to the position shown in Fig. 3 of the drawing so that the finger 10 is directed inwardly and the scales are out of alinement.

This attachment is preferably used with a caliper of any preferred form, but as shown in Fig. 1, I have illustrated the pivoted arm A and B similar to the legs of an ordinary caliper and having each terminal provided with guide members 16 and 17. The end of the arm 1 is extended through the guide member 16 so that the attachment above described is parallel to and carried by the arm A of the caliper. An auxiliary caliper leg or member 18 is adjustably mounted in the guide 17 and has a point 19 which is adapted to coöperate with the finger 10 in using the device. Slidably mounted upon the member 18 is an adjustable collar 20 carrying a stud 21 which has a finger 22 adapted to engage the surface of the shaft when the caliper is in use.

Assuming that it is desired to measure the accuracy of the contour or cylindrical shape of the shaft, the implement is placed in engagement with the shaft as shown in Fig. 1. Obviously the member 20 may be adjusted on the arm 18 until the end of the finger 21 engages the shaft at approximately the center thereof. The points 10 and 19 are engaged with the surface at diametrically opposite points and the caliper is then swung or moved so that the points travel around the surface of the shaft. It will be obvious that as the shaft increases in diameter, the finger 10 will cause the arm 7 to swing on the pivot 2 so that the mark 9 will move toward the plus sign on the end of the scale 3. A reading may thereby be taken to determine the widest or largest diameter of the shaft. When the caliper points engage the lesser diameter, the point 10 will move toward the point 19 and thereby swing the arm 7 on its pivot so that the mark 9 of the scale 8 will move toward the minus sign at the end of the scale 3. A reading may thereby be also taken of the small diameter of the shaft. In this manner, readings at various points around the surface of the shaft can be secured so that it can be definitely determined what the exact shape the shaft is in cross section.

In using the device as shown in Fig. 4, the end of the arm 1 is secured to a lathe post C and the point is permitted to engage the surface of the shaft. The shaft may then be slowly turned so that the finger 10 will be permitted to point either inwardly or outwardly and it will be apparent that the variations will be readily observed from the relative changes of the scales 3 and 8.

The graduations, as shown in Fig. 6, may be as fine as desired and it will be understood that the ordinary vernier may be employed or the graduations may be arranged in any preferred manner.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. The combination with the movable legs of a pair of calipers, comprising an arm adjustably connected to one of the legs, and having a complementary arm pivotally connected to the end thereof, the said complementary arm being provided with a finger adapted to coöperate with the finger on the other leg of the caliper, and scales carried by the said arms and relatively movable when the said arms are moved on their pivots.

2. The combination with an ordinary caliper, including caliper legs, an extension carried by one of the legs, an attachment adjustably mounted on the other leg and including an elongated arm slidably connected to the said leg and having a complementary arm pivoted to its terminal, the said complementary arm being provided with a finger extending beyond the end of the said first mentioned arm, and scales provided with graduations and carried by the said arms for coöperation to indicate the relative movement of the said arms when the same are swung on their pivots.

3. An attachment of the character described comprising an elongated arm having a scale of segmental formation mounted approximately intermediate its ends, a pivot member provided at one end of the said arm, the said scale being arcuate and having its edge curved through an arc struck from the said pivot member, a shorter arm pivotally mounted on the said pivot member and carrying a scale at one end to engage the said first mentioned scale, and a finger formed on the terminal of the said short arm.

4. An attachment of the character described comprising an elongated arm having a scale of segmental formation mounted approximately intermediate its ends, a pivot member provided at one end of the said arm, the said scale being arcuate and having its edge curved through the arc struck from the said pivot member, a shorter arm pivotally mounted on the said first mentioned scale and a finger formed on the terminal of the said short arm, and a spring member mounted on the pivot and engageable with the said arms to normally maintain them in spaced relation.

5. An attachment of the character described comprising an elongated arm having a pivot at one end and provided with a scale approximately intermediate its ends, the scale having a curved edge and provided with a plus sign at one end and a minus sign at the opposite end, a shorter arm pivotally mounted on the end of the said long arm and having a scale at one end adapted to coöperate with the said first mentioned scale and including a centrally located mark for movement toward either the minus or the plus sign on the other scale, and a finger projecting from the pivoted end of said shorter arm, and of a length in proportion to the length of the said shorter arm.

In testimony whereof I affix my signature in presence of two witnesses.

JOHN E. ZION.

Witnesses:
 H. B. DIKEMAN,
 E. A. PENDARVIS.

Copies of this patent may be obtained for five cents each, by addressing the "Commissioner of Patents, Washington, D. C."